F. C. MARES, Jr.
STRAW SPREADER.
APPLICATION FILED APR. 30, 1917.
1,266,968.
Patented May 21, 1918.
2 SHEETS—SHEET 1.
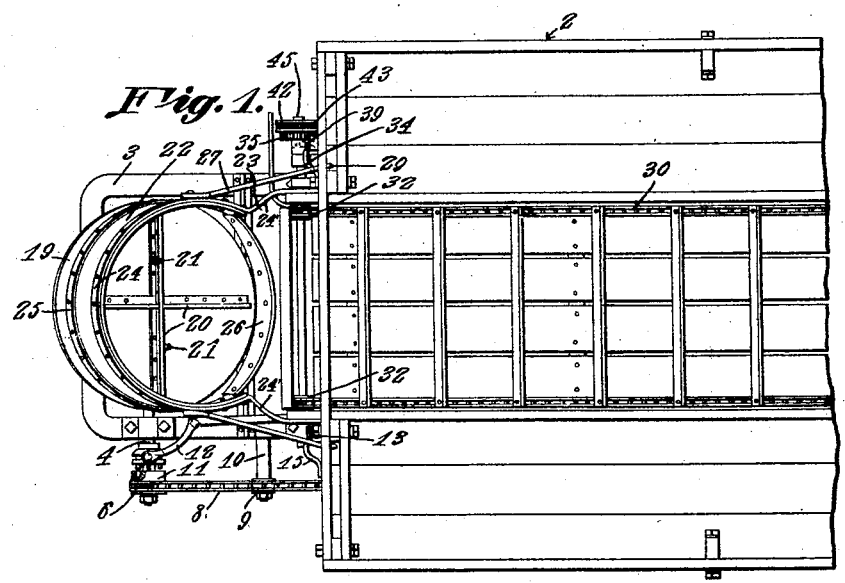
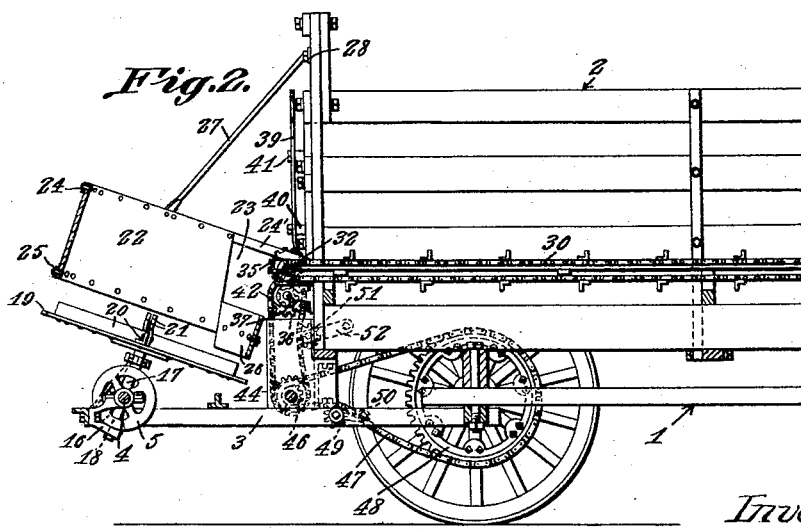
Inventor:
F. C. Mares, Jr.
Witness
By C. A. Snow & Co.
Attorneys

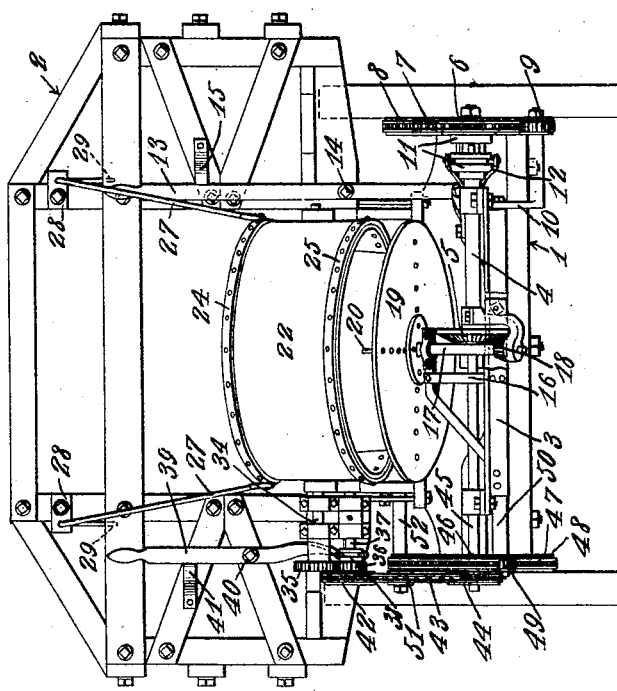

UNITED STATES PATENT OFFICE.

FRANK C. MARES, JR., OF DWIGHT, NEBRASKA.

STRAW-SPREADER.

1,266,968.

Specification of Letters Patent.

Patented May 21, 1918.

Application filed April 30, 1917. Serial No. 165,537.

*To all whom it may concern:*

Be it known that I, FRANK C. MARES, Jr., a citizen of the United States, residing at Dwight, in the county of Butler and State of Nebraska, have invented a new and useful Straw-Spreader, of which the following is a specification.

The subject of this invention is a straw spreader in which an endless carrier is coöperatively associated with a rotary distributer, and the objects of the invention are, first, to provide means for stirring or loosening the straw, second, to provide means for distributing the straw by centrifugal force, third, to provide a distributer which will throw the straw outwardly and upwardly, fourth, to provide means for receiving the straw and regulating its distribution, and fifth, to provide a novel and efficient structure of the character set forth.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:—

Figure 1 is a plan view of a straw spreader constructed in accordance with my invention.

Fig. 2 is a longitudinal vertical section of the same.

Fig. 3 is a rear elevation.

Referring to the drawings by numerals:—

The usual running gear of a wagon is indicated generally at 1 and upon it is mounted a hay rack 2. Secured to the running gear, and projecting rearwardly therefrom, is a horizontally disposed, substantially rectangular frame 3. Journaled in suitable bearings on the frame 3, and arranged transversely thereof, is a horizontally disposed shaft 4 upon which is secured a bevel gear 5. The shaft 4 has a small sprocket wheel 6 loosely mounted on its outer end over which passes a sprocket chain 7. Chain 7 engages a sprocket wheel 8 which is provided on one of the rear wheels of the running gear, and the chain may be adjusted and tensioned by an idling pinion 9 journaled in an arm 10, which is adjustably secured to the frame 3. One member of a clutch 11 is formed on the sprocket wheel 6 while the other member is slidably keyed to the shaft 4 in the usual manner. The forked end of a clutch throw lever 12 which is pivoted to the frame 3 engages the slidable member of the clutch. The lever 12 is thrown by means of a lever 13 which is pivotally attached at one end to an end of the lever 12 and is fulcrumed on a pin 14 which is secured to the rack 2. A catch 15 may be provided for holding the lever 13 in clutch engaging position. A bracket 16 is secured to the frame 3 and within this bracket is journaled an upwardly and forwardly inclined shaft 17, upon which is secured a beveled pinion 18 which meshes with the beveled gear 5.

Secured to the upper end of the shaft 17 is a circular platform or table 19 from the upper face of which rise radially disposed vanes or flanges 20, four being shown in the present instance. Fingers 21 are also secured to the table 19 and rise therefrom and serve to separate and agitate the straw.

A headless drum 22 overhangs the table 19 and is formed with a cut away portion, indicated at 23, to form a straw receiving port. A hoop 24 and a hoop 25 is secured to the upper and lower periphery, respectively, of the drum. The hoop 24 is divided at its forward point and bent to form the forwardly extending arms 24' the ends of which are pivotally secured to a suitable portion of the rack 2. To the forward portion of the hoop 25, underlying the cut out portion 23, is secured an arcuate strip 26, as shown, which forms a straw receiving and retaining member. The position of the drum 22 may be varied by means of cables 27—27, each of which is secured at one end to the drum and has its other end passed through a suitable guide bracket 28—28 secured to the rack 2, and detachably fastened in any suitable manner as by means of a pin 29.

Any convenient means for feeding straw to this distributer may be employed, that here shown consisting of an endless carrier 30 which is mounted on sprockets 32 secured to horizontally disposed front and rear shafts 34, the rear one only being shown, which are journaled in and arranged transversely of the rack 2. A spur gear 35 is secured to one end of the shaft 34 and meshes with a pinion 36 which is loosely mounted on a shaft 37 arranged parallel with the shaft 34 and journaled in suitable bearings on the rack 2. A clutch member 38 is slidably mounted on the shaft 37 and turns therewith and is adapted to its companion member formed on the pinion 36. The clutch 38 is thrown by a lever 39 which is pivotally secured at 40 to the rack 2 and which may be retained in clutch engaged position by means of a latch 41. A sprocket wheel 42 is secured on the shaft 37 and is engaged by a sprocket chain 43 which passes over another sprocket wheel 44. The sprocket 44 is secured on a horizontally disposed shaft 45 which is journaled in suitable bearings on the frame 3 and is arranged vertically below and parallel with the shaft 37. A small sprocket wheel 46 is also secured on the shaft 45 and is driven by a chain 47 which passes over a sprocket wheel 48 which is secured to the other rear wheel of the running gear 1. The chain 43 may be tensioned by the idler 49 which is pivoted to an arm 50 adjustably secured to the rack 2. The chain 47 may be similarly adjusted by an idler 51 carried by an arm 52 which is adjustably secured to the frame 3.

In practice, the device is operated in the following manner:—Straw or similar material to be spread is placed in the rack 2. The clutches are thrown to engaging position and the wagon propelled. Through the chains 47 and 43, and their sprockets, the pinion 36 will be revolved causing, through the gear 35, revolution of the shaft 34 which will move the endless carrier to draw the straw from the rack and deliver it over the rear end of the carrier. This straw will pass through the opening 23 and into the drum 22 and fall upon the circular plate 19. At the same time the sprocket 8 and chain 7 are driving the sprocket 6 and its shaft 4 with the beveled gear 5. Beveled gear 5 drives, through pinion 18, the shaft 17 and table or platform 19. Revolution of the table 19 will cause the fingers 21 to stir and separate the straw. The vanes 20 will catch the straw and whirl it about with the platform from which it will be thrown by centrifugal force. Because of the inclination given the table 19 the straw will be thrown upwardly from the rear portion of the table and widely distributed. By means of the cables 27 the drum 22 may be raised or lowered to regulate the amount of straw being thrown out from the table. The strip 26 prevents straw being thrown in any quantity toward the rack and running gear.

Having described my invention, what I claim as new and desire to secure by Letters Patent, is:—

A straw spreader, comprising a rack and running gear therefor, means for delivering straw from the rack, a spreader for receiving the delivered straw, a split hoop pivotally secured to the rack, a drum suspended from the hoop and overhanging the spreader, said drum provided with a cut away portion to form a straw receiving port, an arcuate strip below the cut away portion and extending below the drum, means for adjusting the drum, and means for actuating the spreader.

In testimony that I claim the foregoing as my own, I have hereto affixed my signature in the presnce of two witnesses.

FRANK C. MARES, Jr.

Witnesses:
  THOS. W. COUFAL,
  FRANK MARES, Sr.

Copies of this patent may be obtained for five cents each, by addressing the "Commissioner of Patents, Washington, D. C."